US009337505B2

(12) United States Patent
Roychoudhury et al.

(10) Patent No.: US 9,337,505 B2
(45) Date of Patent: May 10, 2016

(54) PROCESS OF REFORMING A SULFUR-CONTAINING LIQUID FUEL

(75) Inventors: Subir Roychoudhury, Madison, CT (US); Christian Junaedi, Cheshire, CT (US); Dennis E. Walsh, Richboro, PA (US)

(73) Assignee: PRECISION COMBUSTION, INC., North Haven, CT (US)

( * ) Notice: Subject to any disclaimer, the term of this patent is extended or adjusted under 35 U.S.C. 154(b) by 309 days.

(21) Appl. No.: 14/007,667

(22) PCT Filed: Mar. 31, 2012

(86) PCT No.: PCT/US2012/000180
§ 371 (c)(1),
(2), (4) Date: Sep. 26, 2013

(87) PCT Pub. No.: WO2012/141766
PCT Pub. Date: Oct. 18, 2012

(65) Prior Publication Data
US 2014/0017583 A1   Jan. 16, 2014

Related U.S. Application Data

(60) Provisional application No. 61/516,941, filed on Apr. 11, 2011.

(51) Int. Cl.
*H01M 8/06* (2006.01)
*C10J 3/20* (2006.01)
(Continued)

(52) U.S. Cl.
CPC ............ *H01M 8/0618* (2013.01); *C01B 3/382* (2013.01); *C10G 27/04* (2013.01);
(Continued)

(58) Field of Classification Search
CPC .......... H01M 8/0618; C10G 2300/807; C10G 2400/04; C10G 2300/805; C10G 27/04; C10G 2400/08; C10G 2300/207; C10G 2300/202; C10G 2300/70; C10G 2300/80; C10G 2300/1055; C10G 2300/4006; C10G 2300/1022; C10G 2300/1051
See application file for complete search history.

(56) References Cited

U.S. PATENT DOCUMENTS 4,483,693 A   11/1984   White
5,051,241 A   9/1991   Pfefferle
(Continued)

FOREIGN PATENT DOCUMENTS

EP   2289846 A2   3/2011
WO   WO2004040672 A2   5/2004
(Continued)

OTHER PUBLICATIONS

I.C. Lee and H.C. Ubanyionwu, "Determination of Sulfur Contaminants in Military Jet Fuels," Fuel, vol. 87 (2008), pp. 312-316.
(Continued)

*Primary Examiner* — Stanley Silverman
*Assistant Examiner* — Syed Iqbal
(74) *Attorney, Agent, or Firm* — Marie F. Zuckerman

(57) ABSTRACT

A process of reforming a liquid fuel comprising from greater than 50 ppmw sulfur to less than 400 ppmw sulfur, the process comprising contacting a liquid hydrocarbon fuel comprising one or more organosulfur compounds in a concentration from greater than 50 ppmw to less than 400 ppmw sulfur with an oxidant and steam or water, the contacting occurring in a catalyst bed comprising a reforming catalyst deposited on an ultra-short-channel-length metal substrate, such that the process is conducted at a peak catalyst temperature greater than 950° C. so as to produce a reformate mixture comprising hydrogen and carbon monoxide.

19 Claims, 3 Drawing Sheets

(51) Int. Cl.
  *C10G 27/04* (2006.01)
  *C01B 3/38* (2006.01)
(52) U.S. Cl.
  CPC .. *C01B 2203/0244* (2013.01); *C01B 2203/042* (2013.01); *C01B 2203/0485* (2013.01); *C01B 2203/065* (2013.01); *C01B 2203/1023* (2013.01); *C01B 2203/1247* (2013.01); *C01B 2203/1614* (2013.01); *C10G 2300/1022* (2013.01); *C10G 2300/1051* (2013.01); *C10G 2300/1055* (2013.01); *C10G 2300/202* (2013.01); *C10G 2300/207* (2013.01); *C10G 2300/4006* (2013.01); *C10G 2300/70* (2013.01); *C10G 2300/80* (2013.01); *C10G 2300/805* (2013.01); *C10G 2300/807* (2013.01); *C10G 2400/04* (2013.01); *C10G 2400/08* (2013.01)

(56) References Cited

U.S. PATENT DOCUMENTS

| | | | |
|---|---|---|---|
| 5,248,489 | A | 9/1993 | Kidd |
| 6,156,444 | A | 12/2000 | Smith |
| 6,984,372 | B2 | 1/2006 | Randhava |
| 7,063,732 | B2 | 6/2006 | Katikaneni |
| 7,504,047 | B2 | 3/2009 | Castaldi |
| 2004/0047799 | A1 | 3/2004 | Randhava |
| 2004/0118747 | A1 | 6/2004 | Cutler |
| 2005/0028445 | A1 | 2/2005 | Roychoudhury |
| 2006/0013760 | A1 | 1/2006 | Shi |
| 2006/0133992 | A1 | 6/2006 | Dieckmann |
| 2007/0092766 | A1 | 4/2007 | England |
| 2007/0130830 | A1 | 6/2007 | Varatharajan |
| 2007/0160880 | A1 | 7/2007 | Fischer |
| 2008/0044347 | A1* | 2/2008 | Roychoudhury ......... C01B 3/38 423/658.3 |
| 2008/0267848 | A1 | 10/2008 | Stephanopoulos |
| 2009/0065400 | A1 | 3/2009 | Song |
| 2009/0151237 | A1 | 6/2009 | Takegoshi |
| 2009/0228146 | A1* | 9/2009 | Roychoudhury ......... C10J 3/723 700/274 |
| 2009/0242458 | A1 | 10/2009 | Soloveichik |
| 2009/0246119 | A1 | 10/2009 | Nicolaos |
| 2009/0252661 | A1 | 10/2009 | Roychoudhury |
| 2009/0293358 | A1* | 12/2009 | Roychoudhury ... B01F 3/04049 48/65 |
| 2009/0317323 | A1 | 12/2009 | Doshi |
| 2010/0181230 | A1* | 7/2010 | Jiang .................... B01J 31/0239 208/97 |
| 2011/0061299 | A1* | 3/2011 | Roychoudhury ... B01F 3/04049 48/197 FM |
| 2012/0090238 | A1 | 4/2012 | Roychoudhury |

FOREIGN PATENT DOCUMENTS

| | | |
|---|---|---|
| WO | WO2004060546 A2 | 7/2004 |
| WO | WO2008025002 A2 | 2/2008 |
| WO | WO 2012087343 A1 | 6/2012 |

OTHER PUBLICATIONS

L. Bromberg, D.R. Cohn, A. Rabinovich, and N. Alexeev, "Plasma Catalytic Reforming of Methane," International Journal of Hydropen Energy, vol. 24 (1999), pp. 1131-1137.

J.T. Sampanthar, H. Xiao, J. Dou, Yin Nah, X. Rong, W. P. Kwan "A Novel Oxidative Desulfurization Process to Remove Refractory Sulfur Compounds from Diesel Fuel," Applied Catalysis B: Environmental, vol. 63 (2006), pp. 85-93.

Y. Wang, J. Latz, R. Dahl, J. Pasei, and R. Peters, "Liquid Phase Desulfurization of Jet Fuel by a Combined Pervaporization and Adsorption Process," Fuel Processing Technology, vol. 90 (2009), pp. 458-464.

Ligang Lin, Yuzhong Zhang, and Ying Kong, "Recent Advances in Sulfur Removal from Gasoline by Pervaporation," Fuel, vol. 88 (2009), pp. 1799-1809.

S. Roychoudhury, D. Walsh, D. Chu, E. Kallio, "Performance of a Diesel, JP-8 Reformer," Army Science Conference, Nov. 27-30, 2006, pp. 1-4.

G. Alptekin, A Jayaraman, M. Dubovik, M. Schaefer, J. Monroe, and K. Bradley, "Desulfurization of Logistic Fuels for Fuel Cell APU's," 26th Army Science Conference, Orlando, FL, Dec. 1-4, 2008.

M. Namazian, S. Sethuraman, G. Venkataraman, Altex Technologies Corporation, "Fuel Preprocessor (FPP) for a Solid Oxide Fuel Cell Auxiliary Power Units," Final Report, DOE Grant DE-FG36-02GO12058, Dec. 2004.

M. Castaldi, M. Lyubovsky, R. LaPierre, W.C. Pfefferle, and S.Roychoudhury, "Performance of Microlith Based Catalytic Reactors for an Isooctane Reforming System," SAE International. publ. No. 2003-01-1366, Mar. 3, 2003.

Roychoudhury, S. et al.: Abstract "Effect of Fuel Sulfur on Reformation of Distillate Fuels," Conference Proceedings, 2008 AICHE Annual Meeting, Phladelphia, PA, Nov. 16-21, 2008; [P/AICHE/ American Institute of Chemical Engineers; 255, Nov. 1, 2008, p. 274d].

Roychoudhury, S. et al.: Slide Presentation "Effect of Fuel Sulfur on Reformation of Distillate Fuels," Conference AICHE Annual Meeting, Philadelphia, PA, Nov. 2008.

Roychoudhury, S. et al.: "Design and Development of a Diesel and JP-8 Logistic Fuel Processor," Journal of Power Sources, Elsevier SA, CH, vol. 160, No. 1, Sep. 29, 2006, pp. 510-513.

European Search Report received in corresponding EP appln No. 12770871.7 (PCT/US2012000180), Aug. 27, 2014, 4 pp.

* cited by examiner

PROCESS OF REFORMING A SULFUR-CONTAINING LIQUID FUEL

CROSS-REFERENCE TO RELATED APPLICATIONS

This application claims the benefit of U.S. provisional patent application Ser. No. 61/516,941, filed Apr. 11, 2011.

GOVERNMENT RIGHTS

This invention was made with support from the U.S. government under Contract No. N00014-06-C-0087 sponsored by the Department of Defense. The U.S. government holds certain rights in this invention.

FIELD OF THE INVENTION

This invention pertains to a process of reforming a liquid fuel containing one or more organosulfur compounds. Preferably, this invention pertains to reforming a sulfur-containing liquid fuel to produce an essentially sulfur-free gaseous reformate suitable for use in fuel cell applications. For the purposes of this invention, the term "sulfur-containing liquid fuel" refers to any fuel comprising one or more liquid hydrocarbons and one or more organosulfur compounds, more particularly, in a sulfur concentration greater than about 50 parts per million by weight (50 $ppm_w$) and less than about 400 $ppm_w$.

BACKGROUND OF THE INVENTION

Up to the present time, deployment of fuel cells in field operations and military applications has been inhibited, due to an inability to use widely-available logistic fuels as a primary energy source. The term "logistic fuel" refers to any fuel that is approved by the U.S. government as acceptable for logistic maneuvers or field operations. JP-8 fuel is a preferred logistic fuel. Logistic fuels typically comprise sulfur in a concentration ranging from about 100 $ppm_w$ up to about 3,500 $ppm_w$ in the form of high molecular weight organosulfur compounds.

Reforming catalysts can be severely affected by sulfur-containing fuels resulting in unacceptable process performance and endurance, as evidenced by lower fuel conversion, lower thermal efficiency, reduced hydrogen output, an unacceptable concentration of coke precursors, and an unacceptable catalyst lifetime, as compared to reforming processes using sulfur-free fuels containing less than 50 $ppm_w$ sulfur. A low quality reformate stream with an unacceptable concentration of coke precursors leads to carbon deposition and increased pressure drop, and thus a failure of downstream fuel cell stacks. Operating a fuel reformer at an elevated temperature may compensate for reduced catalytic performance; however, a higher temperature may also hasten catalyst degradation.

To be suitable for use in fuel cell applications, sulfur-containing fuels must be reformed in the presence of a reforming catalyst into clean gaseous reformate, which preferably comprises a mixture of hydrogen and carbon monoxide that is essentially free of sulfur. As used herein, the terms "essentially free of sulfur" and "essentially sulfur-free" refer to a concentration of sulfur of less than about 10 parts per million by volume (10 $ppm_v$), preferably, less than about 5 $ppm_v$, and more preferably, less than about 1 $ppm_v$. Different approaches have been used to achieve acceptable fuel reforming starting from a sulfur-containing fuel. Examples of five such approaches include: (a) plasma reforming, (b) oxidative desulfurization, (c) hydrodesulfurization, (d) pervaporation, and (e) liquid fuel desulfurizer sorption.

In the case of plasma reforming wherein no catalyst is used to assist in the reforming, the process is known to be sulfur tolerant. The main disadvantages, however, include an unacceptably large reactor size, an unacceptably high parasitic power input, and unacceptably high electrode erosion at elevated pressures. As a reference, see L. Bromberg, D. R. Cohn, A. Rabinovich, and N. Alexeev, "Plasma Catalytic Reforming of Methane," International Journal of Hydrogen Energy, 24 (1999), pp. 1131-1137.

Oxidative desulfurization, as described for example in WO-A2-2008/025002 and as disclosed by J. T. Sampanthar, et al. in "A Novel Oxidative Desulfurization Process to Remove Refractory Sulfur Compounds from Diesel Fuel," Applied Catalysis B: Environmental 63 (2006), pp. 85-93, may be effective in converting recalcitrant thiophenes and other refractory sulfur compounds into more tolerable polar sulfoxides, polar sulfones and other polar oxidation products; however, the process has several disadvantages. To name a few, downstream multi-stage cleanup (extraction or adsorption) is needed to remove the polar sulfoxides or sulfones, followed by waste management of such extracted sulfur compounds. The overall system is expensive as well as bulky and, therefore, unacceptable for logistic operations. Moreover, the operational cost of an oxidative desulfurization system increases with increasing sulfur content in the fuel, due to stoichiometric or higher consumption of required oxidant relative to sulfur. Employing an oxidant, such as hydrogen peroxide or pure oxygen, in portable or field operations also poses safety risks.

Hydrodesulfurization (HDS), as disclosed for example in U.S. Pat. No. B2-6,984,372, while being mature for large scale operations and acceptably efficient in removing thiols, sulfides, and disulfides, is far less effective for removing thiophenes, common species of which include dibenzothiophene and its alkylated derivatives. These compounds, especially 4-methyldibenzothiophene and 4,6-dimethyldibenzothiophene, render deep desulfurization by HDS unacceptably difficult. Moreover, the reactivity of the alkyldibenzothiophenes is further decreased in the presence of inhibitors like aromatics and organic nitrogen species, which are ubiquitous in fuels. Accordingly, the HDS approach to desulfurization is limited.

The pervaporation approach, as described for example by Ligang Lin, Yuzhong Zhang, and Ying Kong, in "Recent Advances in Sulfur Removal from Gasoline by Pervaporation," Fuel, 88 (2009), pp. 1799-1809, requires a permeation membrane to separate selectively the organosulfur compounds from the hydrocarbon compounds prior to reforming. The system, which takes a multi-stage approach, also involves challenges in handling the separated fuel fraction (typically 30%) containing the organosulfur compounds. Moreover, a low flux is achieved that makes the system bulky; and an expensive refrigeration system is generally required to condense light hydrocarbons at high vacuum. Finally, increasing aromatics, alkenes, and sulfur content in the feed may lead to increased flux and a decreased organosulfur separation.

Liquid fuel desulfurization involving a sorbent-based adsorption unit may provide an improved methodology for developing integrated fuel processors that can operate with up to 3500 $ppm_w$, sulfur-containing fuels to produce fuel cell quality reformate. Efforts are being made to develop new adsorbents to remove thiophenic compounds from logistic fuels either via n-complexation, van der Waals and electrostatic interactions, or via reactive adsorption by chemisorption at elevated temperatures. Despite considerable efforts put into regenerable liquid fuel desulfurization via adsorption or fuel fractionation/organosulfur compound adsorption, the best approaches have resulted in systems of considerable size and complexity due to their low sulfur sorption capacity. Also, the process removes disadvantageously about 5 percent or more, by weight, of the fuel and has associated parasitic losses for equipment operation (e.g., high pressure drop across the sorbent bed) due to problems associated with organosulfur adsorption. Many commercially available sorbents have unacceptably low sulfur adsorption capacity, low adsorption duration (i.e., fast breakthrough time), and high liquid fuel hold-up. Moreover, regeneration of the sorbent bed requires good thermal management in order to avoid temperature excursions and hot spots that can rapidly deactivate the sorbent materials. As an example of gas fuel desulfurization, see U.S. Pat. No. B2-7,063,732.

In summary, none of the approaches discussed hereinabove is sufficiently simple, compact, economical, and versatile to allow for reforming a liquid fuel containing more than 50 $ppm_w$ organosulfur compounds for an acceptable period of operation. Thus, the clean reformate that is needed as a primary source of energy, especially as may be required in logistic and field operations and in advanced fuel cell stacks, remains far from reach.

SUMMARY OF THE INVENTION

This invention provides for a process of reforming a liquid fuel comprising from greater than about 50 $ppm_w$ to less than about 400 $ppm_w$ sulfur. The process comprises contacting the liquid fuel comprising one or more organosulfur compounds in a concentration from greater than about 50 $ppm_w$ sulfur to less than about 400 $ppm_w$ sulfur with an oxidant and with water or steam, the contacting being conducted in a catalyst bed comprising a reforming catalyst deposited on an ultra-short-channel-length metal substrate, the contacting occurring at a peak catalyst temperature greater than about 950° C., so as to produce a reformate comprising hydrogen and carbon monoxide. For the purposes of this invention, the term "peak catalyst temperature" is defined as the maximum localized catalyst surface temperature measured over the length of the catalyst bed from inlet to outlet.

The invention described hereinabove advantageously permits reforming of a liquid fuel comprising sulfur in a concentration greater than about 50 $ppm_w$ and less than about 400 $ppm_w$ while achieving low coke precursors slippage or breakthrough in the reformate stream, substantially complete fuel conversion, acceptable reforming efficiency, and excellent catalyst lifetime. Specifically, the process is capable of operating with liquid fuels containing up to 400 $ppm_w$ sulfur for up to 1,000 hours with essentially complete fuel conversion and minimal coke formation. These characteristics make the process of this invention well suited for portable and logistic applications, preferably, for integration with deployable fuel cell power generators.

Advantageously, the process of this invention avoids bulky and complex liquid fuel desulfurization and cleanup processes located upstream of the reforming reactor, thereby beneficially reducing system volume, complexity, and cost. Advantageously, the process invention operates with air as the oxidant, thereby avoiding safety issues associated with handling pure oxygen or hydrogen peroxide. As further advantages, the process of this invention avoids the specific disadvantages of desulfurization by plasma reforming, oxidative desulfurization, hydrodesulfurization, pervaporation, and sorbent-based liquid fuel desulfurization methods.

DRAWINGS

DETAILED DESCRIPTION OF THE INVENTION

Figure 1:
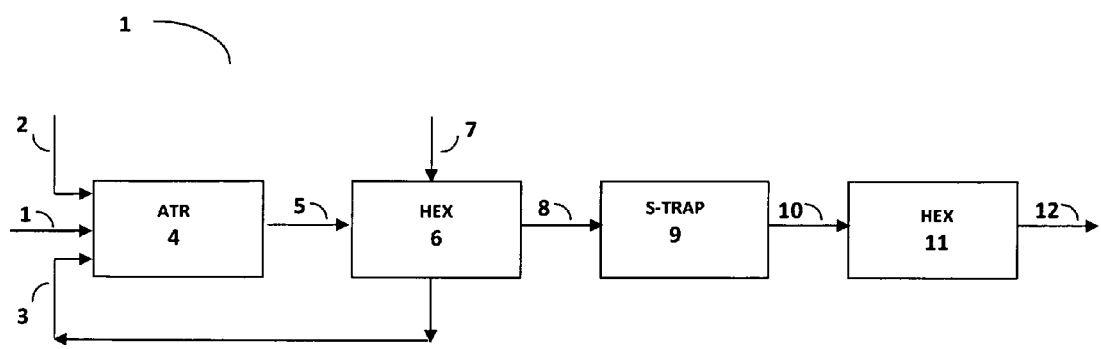
FIG. 1 illustrates a block flow diagram of a preferred process wherein the reforming process of this invention is integrated with heat exchangers and a gas-phase desulfurization trap for production of an essentially sulfur-free reformate.

The following definitions are provided herein to clarify the scope of the invention.

For the purposes of this invention, the term "hydrocarbon(s)" shall broadly refer to any organic compound or compounds consisting essentially of carbon and hydrogen, and further optionally containing nitrogen, oxygen, or a combination of nitrogen and oxygen. The term as used herein does not include compounds containing sulfur. If sulfur is present in a combination with carbon and hydrogen, the compound is specifically referenced herein as an "organosulfur compound" or a "sulfur-containing compound."

The term "liquid hydrocarbon" shall refer to a hydrocarbon that is a liquid at ambient temperature and pressure, taken as 21° C. and 1 atmosphere (101 kPa).

The term "unconverted hydrocarbon" refers to a hydrocarbon compound that is unreacted in the reforming process, thereby exiting the reforming process in the same form in which it entered the reforming process.

The term "partially-converted hydrocarbon" refers to a hydrocarbon compound that is a product of reforming a hydrocarbon fuel. Preferably, the partially-converted hydrocarbon comprises a molecule or chemically-bonded compound comprising carbon, hydrogen, and oxygen atoms. For sake of clarity, the term "partially-converted hydrocarbon" does not include carbon monoxide, carbon dioxide, methane, or water.

The term "coke precursor(s)" refers to a hydrocarbon compound or compounds, preferably containing two (C2) or three (C3) carbon atoms, which under reforming conditions produce graphitic deposits. Typical coke precursors include ethane, ethylene, propane, and propylene. The term "low" as it modifies the term coke precursors" refers to a total concentration of coke precursors of less than about 200 $ppm_v$, preferably, less than about 150 $ppm_v$, and more preferably, less than about 100 $ppm_v$ in a reformate stream exiting the process.

The term "sulfur-containing fuel" shall refer to any fuel comprising one or more liquid hydrocarbons and sulfur in a concentration equal to or greater than about 50 parts per million by weight (50 $ppm_w$) and less than about 400 $ppm_w$.

The term "organosulfur compound" or "organic sulfur compound" shall refer to any compound comprising carbon, hydrogen, and sulfur, suitable examples of which include without limitation organosulfides, organodisulfides, thiophenes, thiols, and mercaptans as known in the art.

For the purposes of this invention, the term "high molecular weight organosulfur compound(s)" shall define a generic organosulfur compound or compounds that occur naturally in the hydrocarbon fuel fed to the process of this invention. Such naturally-occurring or "native" organosulfur compounds may also be considered to be fuel-bound or hydrocarbon-bound. Suitable non-limiting examples of such high molecular weight organosulfur compounds include thiols, disulfides, thiophenes, and derivatives thereof. Preferably, the high molecular weight organosulfur compound has a molecular weight equal to or greater than 90 grams per mole (90 g/mol).

The term "inorganic sulfur compound" shall refer to any compound comprising sulfur and any other element of the Periodic Table of the Elements inclusive of carbon or hydrogen, but exclusive of the combination of carbon and hydrogen. Suitable examples of inorganic sulfur compounds include hydrogen sulfide ($H_2S$), carbonyl sulfide (COS), carbon disulfide ($CS_2$), and sulfur dioxide ($SO_2$).

The generic term "sulfur compound" or "sulfur-containing compound" shall refer to any inorganic or organic compound comprising sulfur.

The term "low molecular weight sulfur compound(s)" shall define a generic sulfur compound or compounds that is/are non-native to the hydrocarbon fuel fed to the process of this invention. These compounds typically have lower molecular weight and correspondingly lower boiling point, as compared to the native high molecular weight organosulfur compounds found in the fuel. Suitable examples of such low molecular weight sulfur compounds include, without limitation, hydrogen sulfide ($H_2S$), carbonyl sulfide (COS), sulfur dioxide ($SO_2$), and carbon disulfide ($CS_2$). Preferably, the low molecular weight sulfur compound comprises an organic or inorganic sulfur-containing compound having a molecular weight less than 90 g/mol.

The phrase "essentially free of sulfur" shall refer to a reformate stream having a sulfur concentration of less than about 10 parts per million volume ($ppm_v$), preferably, less than about 5 $ppm_v$, and more preferably less than about 1 $ppm_v$.

In a preferred embodiment, this invention provides for a process of reforming a liquid fuel comprising from greater than about 50 $ppm_w$ to less than about 400 $ppm_w$ sulfur. The process comprises contacting a liquid fuel comprising one or more high molecular weight organosulfur compounds in a concentration from greater than about 50 $ppm_w$ sulfur to less than about 400 $ppm_w$ sulfur with an oxidant and with water or steam, the contacting occurring in a catalyst bed comprising a reforming catalyst deposited on an ultra-short-channel-length metal substrate at a peak catalyst temperature greater than about 950° C., so as to produce a reformate comprising hydrogen, carbon monoxide, and one or more low molecular weight sulfur compounds. In a more preferred embodiment, the peak catalyst temperature is less than about 1050° C., more preferably, less than about 980° C. In a most preferred embodiment, the peak catalyst temperature ranges from greater than about 950° C. to less than about 970° C.

In another preferred embodiment, the peak catalyst temperature is measured at a distance between about 5 percent and about 50 percent, preferably, between about 5 percent and about 25 percent, along the length of the catalyst bed from the inlet to the outlet. The terms "inlet" and "outlet" take their conventional meanings. The "inlet" is the face of the catalyst bed wherein the reactant fuel and oxidant flows are fed into the catalyst bed; the "outlet" is the face of the catalyst bed wherein the reformate flow exits the catalyst bed. The "length" of the catalyst bed is the distance from the inlet to the outlet of the catalyst bed.

With reference to FIG. 1, in a preferred embodiment of the process of this invention, liquid fuel comprising sulfur in a concentration from about 50 $ppm_w$ to about 400 $ppm_w$ is fed via inlet line 1 into an autothermal reformer (ATR) 4. Likewise, air and steam are fed into the ATR 4 via inlet lines 2 and 3, respectively. An essential component of the ATR 4 is the catalytic substrate comprising one or more noble metals deposited on an ultra-short-channel-length metal substrate (feature not shown in FIG. 1). The reformate exiting ATR 4 is fed via line 5 into a heat exchanger 6. Water is fed via inlet line 7 into heat exchanger 6, wherein the heat of the reformate is used to convert the water into steam, thereby reducing the temperature of the reformate. Steam exiting the heat exchanger 6 via outlet line 3 is fed into the ATR 4 as the source of the required steam. The reformate exiting the heat exchanger 6 via line 8 is sufficiently cooled to be fed into a sulfur trap (sulfur adsorbent bed) 9. A desulfurized reformate exiting the sulfur trap 9 can be fed via inlet line 10 into a second heat exchanger 11, so as to increase its temperature to within a range acceptable for use in a fuel cell stack (not shown in FIG. 1). The heated desulfurized reformate exits the second heat exchanger 11 via outlet line 12.

The fuel supplied to the process of this invention comprises any liquid fuel having a sulfur concentration greater than about 50 $ppm_w$ sulfur, preferably, greater than about 80 $ppm_w$ sulfur, and more preferably, greater than about 100 $ppm_w$ sulfur, obtainable, for example, from a petroleum, biomass, or synthetic source. The fuel suitable for this process has a sulfur concentration advantageously less than about 400 $ppm_w$, preferably, less than about 375 $ppm_w$, and more preferably, less than about 350 $ppm_w$. The fuel itself is a liquid at about 21° C. and 1 atmosphere pressure; and preferably, has a normal boiling point in a range from about 200° C. to about 400° C. The fuel comprises a mixture of paraffinic, cycloaliphatic, and aromatic hydrocarbons, and one or more organosulfur compounds of individual molecular weight equal to or greater than 90 g/mol. Suitable fuels include, without limitation, high sulfur content diesel, kerosene, and jet propulsion fuels, such as JP-8, JP-5, and Jet A, as well as similar logistic fuels, biodiesel, and fuels obtained from synthetic sources, such as Fisher-Tropsch processes. The preferred sulfur-containing fuel is JP-8 fuel.

The oxidant employed in the process of this invention comprises any oxidant capable of reaction in reforming processes. Suitable oxidants include without limitation air, essentially pure oxygen, oxygen-enriched nitrogen, and oxygen-enriched inert gases, such as oxygen-enriched helium and argon, where the term "oxygen-enriched" refers to a concentration of oxygen greater than about 20 mole percent up to about 99 mole percent. Preferably, the oxidant is air. Generally, any ratio of oxidant to liquid fuel may be employed, provided that the ratio produces the desired reforming outcome while maintaining the desired peak catalyst temperature. The quantities of oxidant and fuel fed to the process are best described as an "O/C ratio," wherein "O" represents the number of oxygen atoms in the oxidant and "C" represents the number of carbon atoms in the liquid fuel fed to the reformer. Advantageously, the O/C ratio ranges from about 0.8/1 to about 1.3/1, and preferably, from about 0.9/1 to about 1.1/1. As explained in detail hereinbelow, the O/C ratio is not held constant, but rather is floated throughout the process within the aforementioned ranges, so as to maintain the peak catalyst temperature of greater than about 950° C. and, preferably, less than about 1050° C.

Steam or water is also required to be co-fed with the fuel and oxidant to the reforming process; such a process being known as "autothermal reforming" or "ATR". Preferably, the process is conducted in the presence of co-fed steam. The moles of steam or water fed to the process is best described in terms of a "St/C ratio," wherein "St" refers to moles of steam or water fed into the reactor and "C" refers to moles of carbon in the liquid fuel. Advantageously, the St/C ratio ranges from about 0.8/1 to about 1.3/1, preferably, from about 0.90/1 to about 1.0/1. If the peak catalyst temperature is to be increased, it may be advantageous to increase the St/C ratio as well as the O/C ratio.

Any reforming catalyst can be employed, provided that such catalyst is capable of reforming the organic components of the fuel into a gaseous mixture comprising carbon monoxide and hydrogen. Preferably, the reforming catalyst is also capable of oxidizing the high molecular weight organosulfur compounds in the liquid fuel to low molecular weight sulfur compounds. Preferably, the reforming catalyst comprises one or more noble metals selected from ruthenium, rhodium, palladium, osmium, iridium, platinum, silver, and gold, and mixtures thereof. In this invention the reforming catalyst is required to be deposited on an ultra-short-channel-length metal substrate. The deposition of the catalytic noble metal(s) onto the metal substrate can be implemented by methods well known in the art. Alternatively, finished catalysts comprising noble metal(s) deposited and bound to an ultra-short-channel-length metal substrate can be purchased commercially from Precision Combustion, Inc., North Haven, Conn. The metal substrate is preferably employed in a mesh or foam form; but the substrate is not limited to such structures, and other structures may be suitable.

In a most preferred embodiment, the reforming catalyst comprises one or more noble metals, preferably, rhodium or rhodium and one or more metals other than rhodium, deposited on a Microlith® brand ultra-short-channel-length metal mesh substrate. The Microlith® brand substrate can be obtained commercially from Precision Combustion, Inc., noted hereinabove. A description of the technology can be found, for example, in U.S. Pat. No. 5,051,241, incorporated herein by reference. Generally, the design comprises ultra-short-channel-length, low thermal mass metal monoliths that contrast with prior art monoliths having longer channel lengths. For the purposes of this invention, the term "ultra-short-channel-length" refers to channel lengths in a range from about 25 microns (μm) (0.001 inch) to about 500 μm (0.02 inch). Thus, in visual appearance the preferred metal mesh substrate of ultra-short-channel-length looks like a reticulated net or screen. In contrast, the term "long channels" pertaining to prior art monoliths refers to channel lengths greater than about 5 mm (0.20 inch) upwards of 127 mm (5 inches). (Note that the channel length of the substrate is not to be confused with the length of the catalyst bed. The two lengths are different in kind and degree.)

As compared with prior art monolithic substrates, the preferred Microlith® brand ultra-short-channel-length metal mesh substrate facilitates packing more active surface area into a smaller volume and provides increased reactive area for a given pressure drop. Whereas in prior art honeycomb monoliths having conventional long channels, a fully developed boundary layer is present over a considerable length of the channels; in contrast, the ultra-short-channel-length characteristic of the preferred catalyst of this invention avoids boundary layer buildup. Since heat and mass transfer coefficients depend on boundary layer thickness, avoiding boundary layer buildup enhances transport properties. The advantages of employing the ultra-short-channel-length metal substrate, and preferably, the Microlith® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference.

The ultra-short-channel-length metal substrate employed in this invention can be provided in any configuration or structure, provided that the reforming process of this invention is operable. One preferred configuration comprises a coil (or coiled configuration) in which a sheet of metal mesh is rolled on itself to provide for a radial flow path from an inlet of inner diameter to an outlet of larger outer diameter. Alternatively, the catalyst can be employed as a sheet or a plurality of metal mesh layers stacked, typically, in an orderly-pile one on the other. In the stacked catalyst, the number of layers advantageously ranges from 2 to about 500 or more. The stack of layers is typically compressed to reduce or minimize void spaces between each layer. In the coiled or stack configuration, the plurality of metal mesh layers provides for a plurality of void spaces in random order. For the purposes of this invention, the term "catalyst bed" comprises the entire assembly, e.g., coil or stack, of catalytic substrate(s).

Temperature control is an important parameter in the process of this invention. In order to understand the effect of temperature on the process of this invention, we discuss temperature control in somewhat greater detail. Typically, in prior art processes using a bed of pelleted catalyst particles, the temperature of the entire bed can be controlled isothermally, such that the process operates at substantially the same temperature throughout the bed. Isothermal temperature control is typically effected by placing the catalyst bed inside a tubular reactor with heating elements that transfer heat into the bed at substantially the same rate throughout the bed. Hot and cold spots may occur in localized areas of the bed; but generally, it is possible to achieve close to isothermal operation. Conventional ceramic monolith catalysts comprising, for example, pore channels from 5 mm up to 127 mm in length, can also be maintained at substantially isothermal conditions throughout the monolith by implementing an external heat source to provide the required amount of heat to the bed. In such processes of the prior art, a desired predetermined process temperature is typically controlled based on an average temperature of effluent gases or via an average of temperatures measured at various locations within the bed.

In contrast, in the reforming process of this invention, which is exothermic and which employs the catalyst deposited on the ultra-short channel-length metal substrate, the temperature of the catalyst is essentially not isothermal throughout the process. Rather, we have found that the temperature of the catalyst varies as a function of the length of the catalyst bed and as a function of the quantity of sulfur present in the fuel fed to the process. More specifically, we have found that when a fuel having a low sulfur concentration of less than 50 $ppm_w$, and preferably, less than about 10 $ppm_w$, is fed to the process, the temperature of the surface of the catalyst decreases substantially linearly along the length of the catalyst bed as measured from inlet to outlet. Moreover, we have found that at these low sulfur concentrations, the peak catalyst temperature occurs at the inlet of the catalyst bed or, typically, at a distance within the catalyst bed not exceeding 5 percent of the distance along the catalyst bed measured from the inlet to the outlet. For the purposes of this invention, the term "peak catalyst temperature" is defined as the maximum localized catalyst surface temperature measured over the length of the catalyst bed from the inlet to the outlet.

Surprisingly and unexpectedly, we have also found that in such exothermic reforming processes employing the ultra-short-channel-length catalytic substrate and a liquid fuel having a concentration greater than about 50 $ppm_w$ sulfur up to about 400 ppm$_w$ sulfur, the peak catalyst temperature shifts towards the interior of the catalyst, the degree of which depends on the sulfur level in the feed fuel. We have further found that when using a fuel of said higher sulfur concentration, it is advantageous to maintain the peak catalyst temperature greater than about 950° C. The upper limit on the peak catalyst temperature depends upon the durability of the materials from which the catalyst substrate is constructed. Preferably, the peak catalyst temperature is less than about 1050° C., more preferably, less than about 980° C. Most preferably, the peak catalyst temperature is greater than about 950° C. and less than about 970° C. In another preferred embodiment, the temperature at the outlet of the catalyst bed is greater than about 650° C., but less than the peak catalyst temperature.

The measurement of temperature, and specifically peak catalyst temperature, involves attaching a plurality of thermocouples along the length of the catalyst bed and measuring the temperature of the surface of the catalyst at each thermocouple location throughout the process. The peak catalyst temperature may be substantially localized at one location in the catalyst bed. Alternatively, the peak catalyst temperature may travel from location to location within the catalyst bed as a function of operating time and sulfur level in the liquid fuel. The actual number of thermocouples needed to make an adequate determination of peak catalyst temperature will vary depending upon the length of the catalyst bed. For a typical portable reforming apparatus, a suitable number of thermocouples may range from about 3 to about 10. More thermocouples can be added to more locations along the catalyst bed as desired; however, at least three thermocouples are typically employed, with two of the thermocouples being located at a distance between about 5 percent and about 25 percent measured along the length of the catalyst bed from the inlet to the outlet. For the linearly-stacked catalyst configuration, a thermocouple may be attached to each layer of catalytic mesh in the stack.

In the process of this invention, preferably, the peak catalyst temperature is located within the catalyst bed at a distance greater than about 5 percent to less than about 50 percent of the length of the catalyst bed, measured from the inlet to the outlet. More preferably, the peak catalyst temperature is located within the catalyst bed at a distance greater than about 5 percent to less than about 25 percent, measured along the length of the catalyst bed from the inlet to the outlet. Even more surprisingly, we have found that if the peak catalyst temperature is maintained at the aforementioned preferred temperature range within the aforementioned preferred range of distance into the catalyst bed, then the process can be operated with a liquid fuel of sulfur content from greater than about 50 ppm$_w$ to less than about 400 ppm$_w$ for an operating time up to about 1,000 hours without degradation of the catalyst.

The ultra-short-channel-length metal substrate, which is preferably comprised of metal mesh elements typically on the order of about 0.3 mm diameter, can be heated resistively or heated with a glow plug or with hot reaction gases. If the peak catalyst temperature exceeds the desired upper limit, typically about 1050° C., more preferably, less than about 980° C., then the peak catalyst temperature can be reduced by lowering the O/C ratio, either by decreasing the flow of oxidant or increasing the flow of fuel. Conversely, if the peak catalyst temperature falls below the lower limit of about 950° C., then the peak catalyst temperature can be increased by increasing the O/C ratio, either by increasing the flow of oxidant or decreasing the flow of fuel. Preferably, the flow of oxidant is used for temperature control. In actual operation, a "feedback loop" program can be installed to monitor process temperature, either continuously or intermittently, at each thermocouple location; and then based on the measurement of the peak catalyst temperature, the O/C ratio can be modulated by adjusting the oxidant and/or fuel flow(s), as needed.

The operating pressure and flow rates of liquid fuel, oxidant, and steam or water are generally any of those conventional values that provide for the desired reforming process. Preferably, the operating pressure ranges from about 5 psig (35 kPa) to about 25 psig (172 kPa). Preferably, space velocity is greater than about 10,000 liters of combined liquid fuel, oxidant, and water or steam per liter of catalyst per hour (10,000 hr$^{-1}$), and more preferably, ranges from greater than about 20,000 hr$^{-1}$ to less than about 250,000 hr$^{-1}$.

The reformate stream discharged from the reforming reactor comprises carbon monoxide, hydrogen, and one or more low molecular weight sulfur compounds. Optionally, the reformate stream comprises carbon dioxide, and typically low concentrations of steam, partially-converted hydrocarbons, and coke precursors. Preferably, the reformate stream contains little or essentially no unconverted or partially-converted hydrocarbons, which means that the hydrocarbons in the feed fuel are converted to C1 products, comprising carbon monoxide, carbon dioxide, and methane, to an extent greater than about 90 mole percent, preferably, greater than about 95 mole percent, more preferably, greater than about 99 mole percent, and most preferably, greater than 99.9 mole percent. Coke precursors, such as C2 and C3 compounds, may be found in the reformate stream at concentrations of less than 100 ppm$_v$ each, for a total of C2 and C3 coke precursors less than about 200 ppm$_v$, preferably, a total less than about 150 ppm$_v$, and more preferably, a total less than about 100 ppm$_v$. Steam may be present at a concentration of less than about 20 volume percent.

The concentration of low molecular weight sulfur compounds, preferably, H$_2$S and COS, in the reformate stream will depend upon the concentration of sulfur in the liquid fuel fed to the process. Typically, the low molecular weight sulfur compounds comprise from greater than about 3 ppm$_v$ to less than about 40 ppm$_v$ of the reformate stream corresponding to an inlet sulfur concentration in the liquid fuel ranging from greater than about 50 ppm$_w$ to less than about 400 ppm$_w$. We note that although sulfur is not per se reduced in content in the process, the high molecular weight organosulfur compounds, including thiophenes, are converted to low molecular weight sulfur compounds, advantageously H$_2$S and COS, which are more easily removed from the reformate stream to obtain a sulfur-free reformate useful for many applications, including fuel cells.

Typically, the reformate stream exits the reforming reactor at a temperature in a range from about 700° C. to about 800° C. In a preferred embodiment, the reformate stream may be fed into a heat exchanger to reduce its temperature to a range from about 300° C. to about 600° C. Generally, temperature reduction is desirable, if the stream is to be fed into a sulfur adsorbent bed. The heat exchanger can be any conventional apparatus for exchanging heat between a hotter fluid stream and a colder fluid stream. In this instance, the heat from the reformate stream is transferred to a stream of liquid water, thereby assisting in the production of steam or in superheating steam, which may be provided to the inlet of the reforming process, if desired.

After the temperature of the reformate stream is reduced, the stream may be contacted with one or a plurality of sulfur adsorbent bed(s) to reduce the concentration of low molecular weight sulfur compounds in the stream to a value less than 5 ppm$_v$, and preferably, to remove essentially all of the low molecular weight sulfur compounds. It should be mentioned that present day sulfur adsorbent beds do not efficiently remove high molecular weight organosulfur compounds native to the fuels fed to the process. Accordingly, the process of this invention provides the advantage of converting native organosulfur compounds to non-native low molecular weight sulfur compounds that are more readily adsorbed and removed from the reformate stream.

The sulfur adsorbent beds may be disposable or non-disposable; and they may be linked sequentially, or in a temperature and/or pressure swing construction, or in a thermally-linked design, as known in the art. The sulfur adsorbent comprises any material capable of adsorbing low molecular weight sulfur compounds like hydrogen sulfide, carbonyl sulfide, dimethyl sulfide, and ethyl methyl sulfide, preferably, hydrogen sulfide and carbonyl sulfide. Suitable non-limiting examples of sulfur adsorbents include zinc oxide, copper and chromium impregnated activated carbon, various molecular sieves (zeolites), for instance, zeolites X, Y, faujasite, ZSM-5, comprising crystalline aluminosilicate polymers having a three-dimensional interconnecting lattice or network of silica and alumina tetrahedra, as well as sorbent-coated substrates, such as sorbent-coated metallic meshes, foams, and zeolites. Preferably, the sulfur adsorbent comprises a bed of zinc oxide. The temperature, pressure, and flow rate employed in the adsorption step are conventional, as found for example in U.S. Pat. No. 5,248,489, incorporated herein by reference. The desulfurized reformate stream exiting the sulfur sorbent bed typically has a sulfur concentration less than about 5 $ppm_v$ and more preferably, less than about 1 $ppm_v$. This low concentration of sulfur renders the desulfurized reformate stream suitable for use in a fuel cell stack.

In another preferred embodiment, the desulfurized reformate stream is fed into a heat exchanger so as to increase the temperature of the stream for use in a fuel cell stack. The heat can be derived from any heat source, such as steam or an exothermic process, such as the combustion of fuel. The temperature to which the desulfurized reformate stream is raised depends upon the type of fuel cell stack employed. Preferred are solid oxide fuel cell stacks (SOFC), which are somewhat more tolerant to sulfur and carbon monoxide, as compared with polymer electrolyte membrane (PEM) fuel cell stacks.

The following examples are provided to illustrate the invention described herein; however, the examples are not intended to be limiting thereof. The ordinary person skilled in the field will recognize that modifications of the examples can be implemented without changing the scope or intention of the invention. In the examples that follow, the following terms are used.

"Hydrocarbon Conversion," calculated on a mole basis, refers to the percentage of liquid fuel reformed into products relative to the total liquid fuel fed into the process. As noted hereinbefore, hydrocarbon conversion is typically greater than about 90 mole percent, preferably greater than about 95 mole percent, more preferably greater than about 99 mole percent, and most preferably greater than 99.9 mole percent.

"Reforming or Thermal Efficiency" is calculated as follows:

$$[(M_{H2} \times LHV_{H2}) + (M_{CO} \times LHV_{CO})] + (M_{fuel} \times LHV_{fuel})$$

wherein $M_{H2}$=moles of hydrogen in reformate
$LHV_{H2}$=lower heating value of hydrogen
$M_{CO}$=moles of carbon monoxide in reformate
$LHV_{CO}$=lower heating value of carbon monoxide
$M_{fuel}$=moles of fuel fed to reformer
$LHV_{fuel}$=lower heating value of fuel fed to reformer In the process of this invention, the reforming (or thermal) efficiency is typically greater than about 60 percent, preferably, greater than about 70 percent, and more preferably, greater than about 80 percent.

"$H_2$+CO Concentration" is calculated as the combined mole percentage of hydrogen and carbon monoxide taken relative to the total moles of gaseous components including steam (i.e., wet basis) in the reformate stream. In the process of this invention, the "$H_2$+CO Concentration" is typically greater than about 30 mole percent, preferably, greater than about 35 mole percent.

EMBODIMENTS

Example 1

A reforming apparatus in accordance with the invention was constructed and operated as follows. With reference to FIG. 1, JP-8 fuel containing a specified concentration of high molecular weight organosulfur compounds, specifically thiophenes, and air were fed via inlet lines 1 and 2, respectively, into autothermal reformer (ATR) 4. Steam was fed into the ATR via line 3. Further, in the ATR 4, the fuel-air-steam mixture contacted a reforming catalyst comprising rhodium deposited on a Microlith® brand ultra-short-channel-length metal substrate. The substrate was provided as a metal mesh in a coiled configuration of 4.57 cm (1.8 inch) outer diameter and 0.71 cm (0.28 inch) inner diameter. The catalytic substrate was obtained from Precision Combustion, Inc., of North Haven, Conn., USA. The flow of reactants entered the catalytic substrate through its inlet side of small inner diameter; while a reformate product exited the catalytic substrate through its outlet side of larger outer diameter. The reformate exited the ATR reactor via outlet line 5. The reforming process was run at atmospheric pressure and a space velocity of total flow of 47,000 $hr^{-1}$.

The temperature of the catalyst was monitored continuously from several locations along the catalyst length from the inlet face at the inner diameter to the outlet face at the outer diameter of the coil. A standard K-type thermocouple was used to measure the temperature at each location. Thermocouple "A" was placed at a distance 1.75 mm (0.07 inch) from the inlet along the length of the catalytic substrate. Thermocouple "B" was placed at 5 mm (0.2 inch) from the inlet along the length of the catalytic substrate. Thermocouple "C" was placed at the exit face of the catalytic substrate. (The "length" here refers to the radial distance from the inlet at the inner diameter of the coiled substrate to the exit at the outer diameter of the coiled substrate.)

The fuel reformer was tested in a series of test runs for a duration of 50 hours per run, in an autothermal mode at a 5 kilowatt thermal (5 $kW_{th}$) fuel input using fuels containing different sulfur levels, in order to confirm reactor performance and to evaluate durability and sulfur tolerance. During these 50-hr tests, sulfur analysis of the reformate stream was performed using a gas chromatograph equipped with a flame photometric detector (GC/FPD) instrument in order to monitor the presence of hydrogen sulfide ($H_2S$) and carbonyl sulfide (COS), to confirm sulfur balance, and to calculate the conversion of high molecular weight organosulfur compounds to low molecular weight sulfur compounds ($H_2S$+COS). The reformate composition including the total concentration of coke precursors was measured using a GC equipped with a thermal conductivity detector (GC/TCD) instrument.

(a) At the start, the reactor was tested using a fuel containing 50 $ppm_w$ sulfur for 28 hours. The test was initiated at an oxygen to carbon (O/C) ratio of 0.95 and a steam to carbon (St/C) ratio of 0.90. A peak catalyst temperature was observed at Thermocouple "A". A feedback loop maintained the peak catalyst temperature at 960° C. by varying the O/C ratio as needed from 0.95 to 1.0 while maintaining the St/C ratio at 0.90. Maintaining peak catalyst temperature at 960° C. resulted in the elimination of coke precursors in the reformate stream. Also, the $H_2S$ concentration in the reformate stream was measured at 4.9±0.2 $ppm_v$, indicating closure in the sulfur balance and complete conversion of organosulfur compounds to $H_2S$. The fuel reformer gave a complete fuel conversion and greater than 80% reforming efficiency over the experiment. The data are summarized in FIG. 2 (Part III) which provides a graph of fuel conversion, reforming efficiency, and total "$H_2$+CO" concentration in the reformate stream as a function of time.

Figure 2:
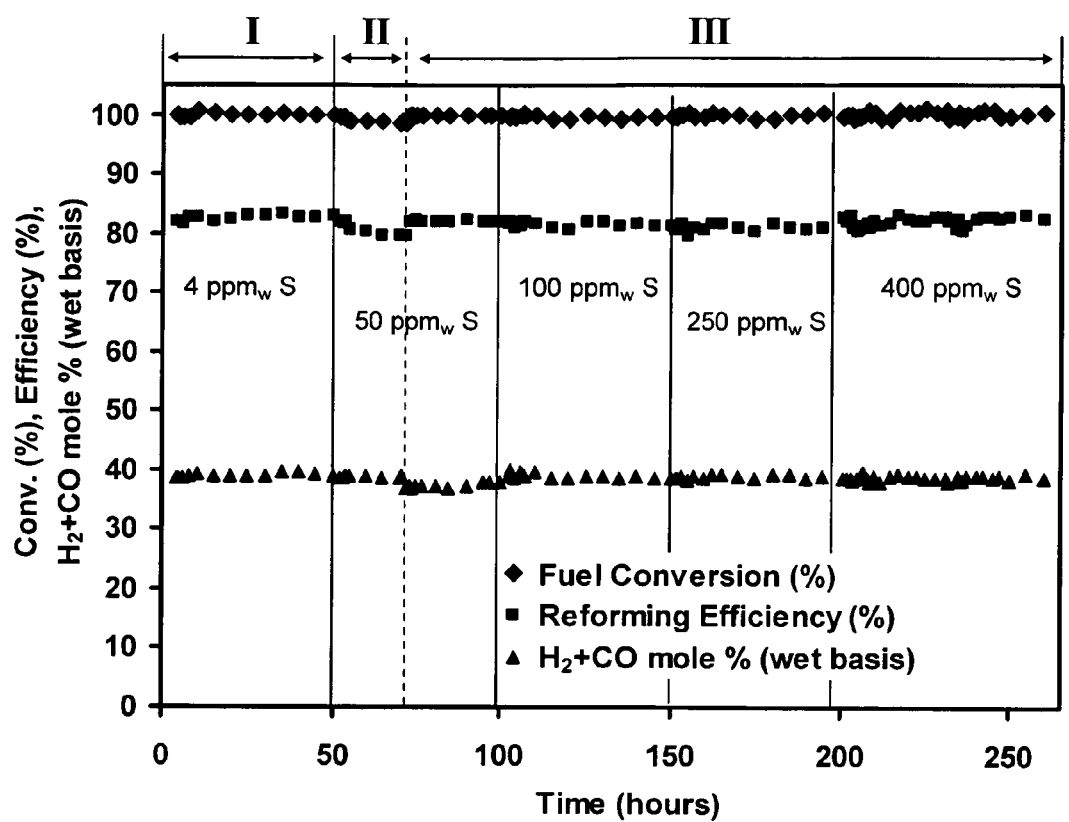
FIG. 2 (Part III) depicts a graph of Fuel Conversion, Reforming Efficiency, and Total ($H_2$+CO) Concentration in a reformate stream as a function of time in an embodiment of this invention. Parts (I) and (II) of this graph, as indicated, plot similar data for a comparative experiment.

(b) In a second run, and with reference to FIG. 2 (Part III), the fuel reformer was operated for 50 hours using JP-8 fuel containing 100 $ppm_w$ sulfur. The O/C ratio was varied, via the temperature feedback loop, to maintain a peak catalyst temperature at Thermocouple A at 960° C. During this 50-hr test, the reactor gave good performance with essentially 100 percent fuel conversion to C1 products and greater than 80 percent reforming efficiency. Sulfur analysis of the reformate stream showed the presence of both $H_2S$ (9.7 $ppm_v$±0.2 $ppm_v$) and COS (0.4 $ppm_v$) indicative of complete conversion of high molecular weight organosulfur compounds to low molecular weight sulfur compounds.

(c) In a third run, and with reference to FIG. 2 (Part III), the fuel reformer was operated using JP-8 fuel containing 250 $ppm_w$ sulfur. The peak temperature was again maintained at 960° C. at Thermocouple A via the feedback control loop of the O/C ratio. Fuel conversion was maintained at essentially 100 percent for another 50 hours. Reforming efficiency was also greater than 80 percent. Sulfur analysis of the reformate stream indicated an $H_2S$ concentration of 23.8±1.3 $ppm_v$ and a COS concentration of 1 $ppm_v$, which was expected for complete conversion of the high molecular weight organosulfur compounds.

(d) In a fourth run, and with reference to FIG. 2 (Part III), the fuel reformer was operated using JP-8 fuel having a 400 $ppm_w$ sulfur content. After operating the reformer for 60 hrs, the reactor peak temperature could still be maintained at 960° C. at Thermocouple A by modulating the air flow rate and the O/C ratio; and the reactor gave good performance with complete fuel conversion and greater than 80 percent reforming efficiency. Total coke precursors were still measured at less than 60 $ppm_v$ total. Furthermore, the sulfur balance calculation indicated a complete conversion of the high molecular weight organosulfur compounds to $H_2S$ and COS.

Comparative Experiment 1

Comparative Experiment 1 was run in the manner of Example 1(a) hereinabove using JP-8 fuel containing only 4 $ppm_w$ high molecular weight organosulfur compounds (thiophenes), rather than 50 $ppm_w$ organosulfur compounds; and with the further distinction that no effort was made to maintain the peak catalyst temperature at 960° C. Rather, the temperature was set at 960° C. and then allowed to float as the process proceeded. The O/C ratio and St/C ratio were set at 0.95 and 0.90, respectively, throughout a 50 hour run. As shown in FIG. 2 (Part I), the hydrocarbon conversion, reforming efficiency, and "$H_2$+CO" concentration held steady and showed no decline over the 50 hour run. Fuel conversion was observed to be essentially 100 percent; reforming efficiency, 82 percent; and "$H_2$+CO" concentration in the reformate, 37 percent. It was concluded that fuels containing a sulfur concentration of less than 5 $ppm_w$ do not degrade the catalyst over a run time of 50 hours; and as such, efforts to control peak catalyst temperature are not necessary.

Comparative Experiment 2

Comparative Experiment 2 was run according Example 1(a) hereinabove using JP-8 fuel containing 50 $ppm_w$ sulfur, with the exception that the peak catalyst temperature was not maintained at 960° C. Rather, the test was performed at O/C of 0.95 and St/C of 0.90 through its duration. As the run progressed, it was observed that the peak catalyst temperature, as recorded by Thermocouple A, decreased over time from 960° C. to 925° C., and the total coke precursor concentration in the reformate increased from 0 $ppm_v$ to 10 $ppm_v$ at 22 hours of operation. These detrimental effects were the result of sulfur catalyst poisoning. As shown in FIG. 2 (Part II), the fuel conversion declined slightly, as did the reforming efficiency. When the O/C ratio was adjusted to return the peak catalyst temperature to 960° C., the conversion and reforming efficiency recovered to initial values, and the quantity of coke precursors was eliminated.

When Example 1 was compared with Comparative Experiment 2, it was seen that the process of the invention allowed for acceptable reforming of liquid fuel with a sulfur content ranging from 50 $ppm_w$ to 400 $ppm_w$, as long as the catalyst peak temperature was maintained at greater than 950° C.; whereas below the peak temperature of 950° C., reforming performance became unacceptable.

Example 2

Figure 3:
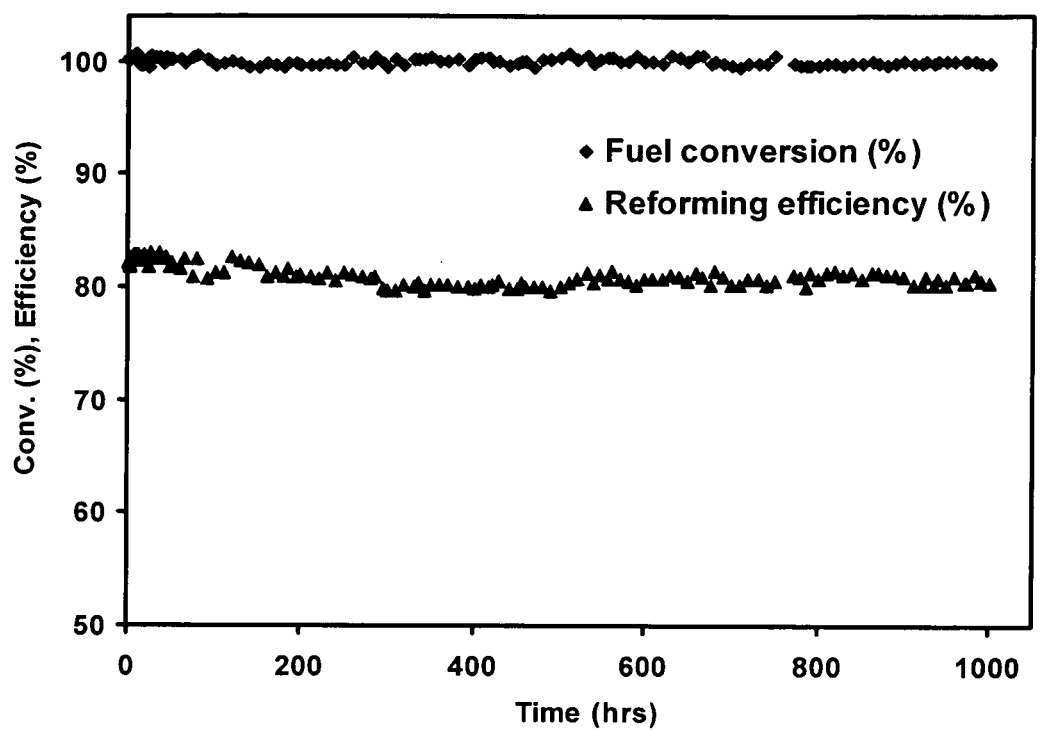
FIG. 3 depicts a graph of Fuel Conversion and Reforming Efficiency as a function of time in an embodiment of this invention involving a 1,000 hour durability test with JP-8 fuel containing 400 $ppm_w$ organosulfur compounds.

Example 1 (d) was repeated using JP-8 fuel containing 400 $ppm_w$ high molecular weight organosulfur compounds, with the results shown in FIG. 3. It was found that the process could be run for 1,000 hours without significant sign of catalyst degradation. During the 1,000 hour test, the peak catalyst temperature was maintained at 960° C. at Thermocouple A by varying the O/C ratio via regulation of the air flow rate. A standard feedback loop from the controlling thermocouple ("A") to the air flow regulator was employed. Throughout the test, the St/C ratio was fixed at 0.90.

Initially, the reforming process was operated at an O/C ratio of 0.95. As the temperature showed signs of decreasing below 960° C., the O/C ratio was increased gradually during the course of the test, reaching 1.08 at the end of the 1,000 hr test. The results, as shown in FIG. 3, indicate that reactor performance was stable with essentially complete fuel conversion and a reforming efficiency of greater than or equal to 80 percent. A slight reduction in the reforming efficiency was observed from an initial value of about 83 percent (up to 200 hrs of operation) to a steady value of 80 percent. The decrease in efficiency was due to the possible oxidation of $H_2$ and CO when operating the fuel reformer at a higher O/C ratio.

The coke precursors in the reformate stream were monitored as a function of time throughout the 1,000 hr test. The total concentration of coke precursors in the first 400 hr of testing was observed to be less than 20 $ppm_v$ (wet basis) and was observed at 1,000 hours to be 110 $ppm_v$ (wet basis).

The invention claimed is:
1. A process of reforming a sulfur-containing liquid fuel, the process comprising contacting a liquid hydrocarbon fuel with an oxidant and steam or water, the liquid hydrocarbon fuel comprising one or more high molecular weight organosulfur compounds each independently having a molecular weight equal to or greater than 90 g/mole, the liquid hydrocarbon fuel having a sulfur concentration from greater than 50

$ppm_w$ to less than 400 $ppm_w$, the contacting occurring in a catalyst bed comprising a reforming catalyst deposited on an ultra-short-channel-length metal substrate, such that the process is conducted at a peak catalyst temperature greater than 950° C., wherein the peak temperature located at a length from 5 percent to 50 percent along the catalyst bed as measured from inlet to outlet, so as to produce a reformate mixture comprising hydrogen and carbon monoxide and one or more low molecular weight sulfur-containing compounds each independently having a molecular weight less than 90 g/mole.

2. The process of claim 1 wherein the liquid fuel has a sulfur concentration greater than 100 $ppm_w$ and less than 375 $ppm_w$.

3. The process of claim 1 wherein the liquid fuel is selected from kerosene, diesel, JP-8, JP-5, Jet A, biodiesel, and Fisher-Tropsch fuels.

4. The process of claim 1 wherein the oxidant is selected from air, essentially pure oxygen, oxygen-enriched nitrogen, and oxygen-enriched inert gases.

5. The process of claim 1 wherein the ultra-short-channel-length metal substrate is in the form of a stacked or coiled metal mesh.

6. The process of claim 1 wherein the process is conducted at an oxygen to carbon (O/C) mole ratio ranging from 0.6/1 to 1.3/1.

7. The process of claim 1 wherein the process is conducted at a steam to carbon (St/C) ratio ranging from 0.8/1 to 1.3/1.

8. The process of claim 1 wherein the peak catalyst temperature is greater than 950° C. and less than 1050° C.

9. The process of claim 8 wherein the process is conducted at a temperature at the outlet of the catalyst bed of greater than 650° C. and less than the peak catalyst temperature.

10. The process of claim 1 wherein the process is conducted at a gas hourly space velocity of combined feeds of liquid hydrocarbon fuel, oxidant, and water or steam of greater than 10,000 $hr^{-1}$ and less than 250,000 $hr^{-1}$.

11. The process of claim 1 wherein the reformate mixture exiting the process further comprises one or more low molecular weight sulfur compounds in a concentration ranging from greater than 3 $ppm_v$ to less than 40 $ppm_v$.

12. The process of claim 11 wherein the one or more low molecular weight sulfur compounds are selected from hydrogen sulfide, carbonyl sulfide, sulfur dioxide, and mixtures thereof.

13. The process of claim 1 wherein the peak catalyst temperature is located at a distance from 5 percent to about 25 percent as measured along the length of the catalyst bed from inlet to outlet.

14. The process of claim 1 wherein the process achieves a conversion of hydrocarbon compounds in the liquid fuel to C1 products, as measured in the reformate mixture exiting the process, of greater than 90 percent.

15. The process of claim 1 wherein a reforming efficiency of the process is greater than 70 percent.

16. The process of claim 1 wherein a total concentration of $H_2$ and CO in the reformate mixture exiting the process is greater than 30 percent.

17. The process of claim 1 wherein the total concentration of coke precursors in the reformate mixture exiting the process is less than 150 $ppm_v$.

18. The process of claim 1 wherein the reformate mixture exiting the process is fed into a heat exchanger to reduce its temperature to a range between 300° C. and 600° C.

19. The process of claim 18 wherein the reformate mixture exiting the heat exchanger is contacted with a sulfur adsorbent, so as to produce a desulfurized reformate stream comprising carbon monoxide and hydrogen and having a sulfur concentration less than 5 $ppm_v$.

* * * * *